No. 696,691. Patented Apr. 1, 1902.
J. G. McCORMACK.
VALVE FOR ENGINES.
(Application filed June 22, 1901.)
(No Model.)
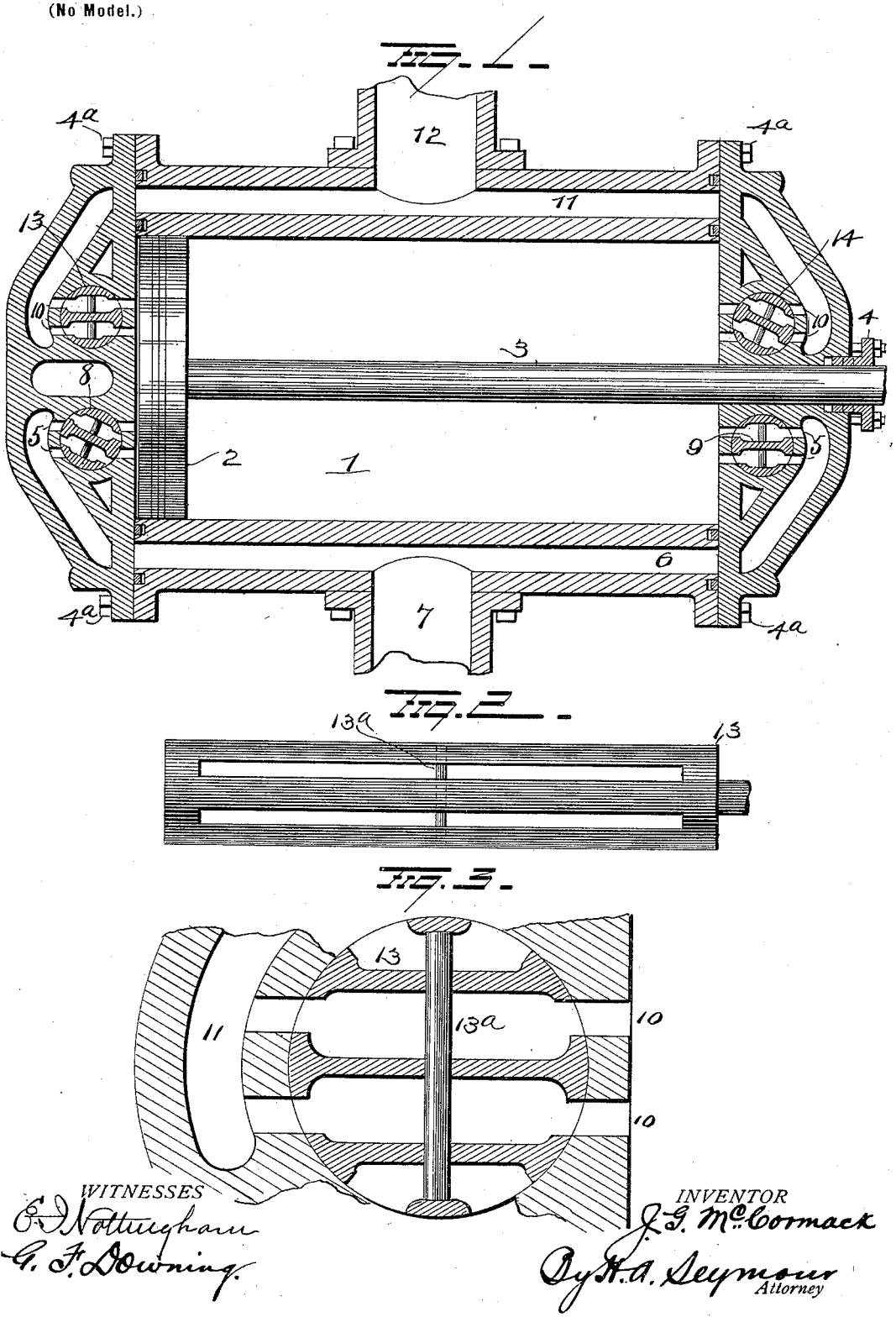
WITNESSES
O. J. Nottingham
G. F. Downing
INVENTOR
J. G. McCormack
By H. A. Seymour
Attorney

UNITED STATES PATENT OFFICE.

JOHN G. McCORMACK, OF CLEVELAND, OHIO.

VALVE FOR ENGINES.

SPECIFICATION forming part of Letters Patent No. 696,691, dated April 1, 1902.

Application filed June 22, 1901. Serial No. 65,664. (No model.)

*To all whom it may concern:*

Be it known that I, JOHN G. MCCORMACK, a resident of Cleveland, in the county of Cuyahoga and State of Ohio, have invented certain new and useful Improvements in Engines; and I do hereby declare the following to be a full, clear, and exact description of the invention, such as will enable others skilled in the art to which it appertains to make and use the same.

My invention relates to an improvement in valves for engines, and more particularly to the construction, location, and operation of the steam-ports and valves therefor, the object of the invention being to provide improvements of this character which will reduce the clearance volume to the lowest possible quantity and provide large and free steam-passages.

A further object is to provide improved internal construction of cylinder-heads which will be provided with large steam-passages leading into and passing out of the same and mount therein improved double-ported valves adapted to be operated for the purpose of opening and closing the steam-ports through said heads and when open forming straight-line openings through both ports.

A further object is to construct the cylinder-heads of a steam-engine so as to be easily removed for repairs.

With these objects in view the invention consists in certain novel features of construction and combinations and arrangements of parts, as will be more fully hereinafter described, and pointed out in the claims.

In the accompanying drawings, Figure 1 is a view in section, illustrating my improvements. Fig. 2 is a view of one of the valves removed, and Fig. 3 is an enlarged view in section of the valve.

1 represents the engine-cylinder, in which the piston 2 is mounted and secured to piston-rod 3, projecting through one head of the cylinder, where it is provided with suitable steam-packing 4. Each head of the cylinder is secured in position by bolts 4ª, so as to permit the easy removal of the heads for the purpose of repair, and the heads are each provided with parallel exhaust-ports 5, communicating with an exhaust-passage 6, having an outlet 7 in the bottom of the cylinder, and the exhaust-ports 5 in the heads of the cylinder are closed by valves 8 and 9, respectively. Each head of the cylinder is also provided with parallel inlet-ports 10 for the live steam, and these ports communicate with a steam-passage 11, having an inlet 12 at the top of the cylinder, and the inlet-ports 10 in the head of the cylinder are closed by valves 13 and 14, respectively.

All of the valves 8, 9, 13, and 14 are constructed alike, and hence the following description of valve 13 will apply alike to all: The valve is elongated and of general cylindrical shape and provided at one end with a shaft or rod 15, connected with any approved operating mechanism. (Not shown.) Parallel ports are provided in the valve extending throughout the greater portion of its length, so that when the valve is turned to the position shown in Fig. 3 the ports therein will aline with the ports 10 in the cylinder and permit the free entrance of steam behind the piston, and when turned to the position of valve 14 in Fig. 1 it will entirely close said ports, and the pressure of steam is equally distributed against the valve and holds the same tightly on its seat, and any escape of steam is prevented, and as the valve is cylindrical in shape slight wear thereon will not affect its perfect operation, as the pressure of steam will hold it tight upon its seat. A brace rod (or rods) 13ª is secured transversely through the valves to prevent springing or warping and consequent imperfect operation thereof.

The operation of my improvement is as follows: When the parts are in the position shown in Fig. 1, valve 13 is open to admit steam behind the piston, while exhaust-valve 8 in this head of the cylinder is closed. Exhaust-valve 9, however, in the other head of the cylinder is open to permit the steam in front of the piston to exhaust through ports 5 into passage 6 and escape through outlet 7, while steam-inlet valve 14 is closed to prevent the entrance of steam in front of the piston. The steam entering valve 13 behind the piston will drive it to the other end of the cylinder when the open valves are closed and the others opened to drive the piston to the other end of the cylinder.

By providing the two-way or double-ported valves, which quickly open or close and when open give a large passage for the live steam or exhaust-steam, thus affording slight resistance to its rapid entrance or escape, I thereby save power and economize in the operation of the engine.

Various slight changes might be resorted to in the general form and arrangement of the several parts described without departing from the spirit and scope of my invention, and hence I would have it understood that I do not wish to limit myself to the precise details set forth, but consider myself at liberty to make such slight changes and alterations as fairly fall within the spirit and scope of my invention.

Having fully described my invention, what I claim as new, and desire to secure by Letters Patent, is—

1. In an engine, the combination of a cylinder and heads thereon, each head having a duct and a valve-chamber between said duct and the cylinder and alined ports between the valve-chamber and said duct and between the valve-chamber and the cylinder, and a valve in said valve-chamber, having a duct to connect said ports and form free passages or ducts between the first-mentioned duct and the cylinder.

2. In an engine, the combination of a cylinder, heads on the ends thereof, each head having a valve-chamber, a duct behind the valve-chamber, and ports between the valve-chamber and duct and the valve-chamber and cylinder, and a rotary valve in said valve-chamber having ducts to aline with all of said ports.

3. In an engine, the combination with a cylinder, of heads secured thereto, each head having two ducts therein, one for live steam and the other for exhaust, and having two valve-chambers located between the respective ducts and the inner face of the cylinder-head, alined ports connecting the valve-chambers with the cylinder and with said ducts, valves in said valve-chambers, each of said valves having ducts extending transversely through the same and adapted to connect the alined ports.

4. In an engine, the combination of a cylinder having a live-steam duct and an exhaust-steam duct in its wall, heads on the ends of said cylinder, each head having two valve-chambers communicating with the ends of the cylinder, and each head having two ducts extending behind the respective valve-chambers and communicating with the latter through ports in line with the axis of the cylinder, the ducts in the heads communicating with the live-steam and exhaust ducts, and a valve in each valve-chamber, each of said valves having ducts extending transversely through the same, substantially as and for the purpose set forth.

5. A valve for engines having a general cylindrical shape and parallel ports extending throughout the greater portion of the length of the valve, and a brace-rod extending transversely through all the ports of the valve and bracing all the walls of said ports.

In testimony whereof I have signed this specification in the presence of two subscribing witnesses.

JOHN G. McCORMACK.

Witnesses:
 SAMUEL DRESSLER,
 FRANK WADE.